(12) United States Patent
Billaud et al.

(10) Patent No.: US 7,688,250 B2
(45) Date of Patent: Mar. 30, 2010

(54) METHOD FOR PRE-DETECTING RESPONSES IN A SECONDARY RADAR OR APPLICATION TO THE DETECTION OF MODE S RESPONSES

(75) Inventors: Philippe Jean Billaud, Fontenay Aux Roses (FR); Claude Rene De Volder, Auffargis (FR)

(73) Assignee: Thales (FR)

( * ) Notice: Subject to any disclaimer, the term of this patent is extended or adjusted under 35 U.S.C. 154(b) by 607 days.

(21) Appl. No.: 10/575,075

(22) PCT Filed: Sep. 29, 2004

(86) PCT No.: PCT/EP2004/052361

§ 371 (c)(1),
(2), (4) Date: Apr. 7, 2006

(87) PCT Pub. No.: WO2005/038486

PCT Pub. Date: Apr. 28, 2005

(65) Prior Publication Data

US 2008/0238758 A1    Oct. 2, 2008

(30) Foreign Application Priority Data

Oct. 10, 2003    (FR) .................................. 03 11893

(51) Int. Cl.
G01S 13/87 (2006.01)
G01S 7/292 (2006.01)
G01S 13/74 (2006.01)
G01S 13/00 (2006.01)

(52) U.S. Cl. .............................. 342/40; 342/29; 342/30; 342/32; 342/36; 342/37; 342/159; 342/175; 342/195

(58) Field of Classification Search .................. 342/13, 342/20, 29–52, 58, 60, 89–93, 175, 195, 342/159–174; 375/239, 316, 324–351; 329/311–314
See application file for complete search history.

(56) References Cited

U.S. PATENT DOCUMENTS 2,678,437 A * 5/1954 Coley et al. ................... 342/36

(Continued)

FOREIGN PATENT DOCUMENTS

| EP | 0184956 A1 * | 6/1986 |
| FR | 2692995 A | 12/1993 |
| WO | 02/082121 A | 10/2002 |

OTHER PUBLICATIONS

W. Stamper, "Understanding mode S technology"; "RF Design" magazine; Dec. 2005 issue; pp. 18-21; posted on the Internet at rfdesign.com.*

Primary Examiner—Bernarr E Gregory
(74) Attorney, Agent, or Firm—Lowe Hauptman Ham & Berner, LLP

(57) ABSTRACT

The invention relates to a method for pre-detecting responses in a secondary radar. It applies in particular to the detection of mode S responses. An aim of the invention is to process the signals received before decoding the responses so as to allow the detection of mixed responses, and avoid the detection of ghost responses. For this purpose, the invention has in particular as subject a method for pre-detecting responses in a secondary radar, the responses to be pre-detected comprising a message coded by a modulated signal, characterized in that the presence of a signal exhibiting modulation characteristics in accordance with those of a message of a response to be pre-detected is identified; the duration of the signal identified is measured; this duration is compared with a minimum duration, this minimum duration being determined on the basis of the duration of the messages of the responses to be pre-detected.

13 Claims, 7 Drawing Sheets

U.S. PATENT DOCUMENTS

| | | | | |
|---|---|---|---|---|
| 4,334,224 A * | 6/1982 | Gordon | | 342/37 |
| 4,796,030 A * | 1/1989 | Colotti et al. | | 342/40 |
| 5,063,386 A * | 11/1991 | Bourdeau et al. | | 342/40 |
| 5,089,822 A * | 2/1992 | Abaunza et al. | | 342/30 |
| 5,341,139 A * | 8/1994 | Billaud et al. | | 342/40 |
| 5,367,303 A * | 11/1994 | Waltz | | 342/37 |
| 5,455,586 A * | 10/1995 | Barbier et al. | | 342/37 |
| 5,486,829 A * | 1/1996 | Potier et al. | | 342/40 |
| 5,528,244 A * | 6/1996 | Schwab | | 342/37 |
| 5,835,059 A * | 11/1998 | Nadel et al. | | 342/37 |
| 6,169,770 B1 * | 1/2001 | Henely | | 375/349 |
| 6,191,727 B1 * | 2/2001 | Springer et al. | | 342/195 |
| 6,459,402 B1 * | 10/2002 | Tsunehara et al. | | 342/47 |
| 6,473,027 B1 * | 10/2002 | Alon | | 342/37 |
| 6,657,579 B2 * | 12/2003 | Ishifuji et al. | | 342/47 |
| 6,792,058 B1 * | 9/2004 | Hershey et al. | | 375/347 |
| 6,819,282 B1 * | 11/2004 | Galati et al. | | 342/37 |
| 6,856,274 B1 * | 2/2005 | Johnson | | 342/32 |
| 6,900,753 B2 * | 5/2005 | Tsunehara et al. | | 342/47 |
| 7,015,856 B1 * | 3/2006 | Johnson | | 342/32 |
| 7,391,359 B2 * | 6/2008 | Ootomo et al. | | 342/37 |
| 7,408,497 B2 * | 8/2008 | Billaud et al. | | 342/37 |
| 7,609,197 B2 * | 10/2009 | Tsunehara et al. | | 342/47 |
| 2002/0149511 A1 * | 10/2002 | Tsunehara et al. | | 342/47 |
| 2002/0180631 A1 * | 12/2002 | Alon | | 342/37 |
| 2004/0066332 A1 * | 4/2004 | Tsunehara et al. | | 342/47 |
| 2004/0233095 A1 * | 11/2004 | Galati et al. | | 342/37 |

* cited by examiner

METHOD FOR PRE-DETECTING RESPONSES IN A SECONDARY RADAR OR APPLICATION TO THE DETECTION OF MODE S RESPONSES

FIELD OF THE INVENTION

The present invention applies to the surveillance of air traffic especially civil air traffic, or more particularly, to ground-aircraft cooperative systems which make it possible to pinpoint in terms of radial distance or azimuth the aircraft present in a certain volume or to interrogate them.

BACKGROUND OF THE INVENTION

These cooperative systems comprise a so-called secondary surveillance radar and airborne transponders aboard the aircraft. The secondary radar cooperates according to a determined protocol with airborne transponders (also called responders) aboard the aircraft. The secondary radar comprises an interrogator that emits interrogation pulses modulated in amplitude and in phase at the frequency of 1030 MHz so as to establish a communication with the transponders present in the emission lobe of its antenna. The transponders present in the antenna lobe respond with trains of pulses modulated in amplitude at the frequency of 1090 MHz. These pulses are received and processed by a receiver of the secondary radar.

Secondary radars are used both in civil and military applications, in the guise of surveillance radar (known as "Secondary Surveillance Radar" or SSR) or anti-collision radar (airborne radar). The International Civil Aviation Convention, also known as the ICAO (International Civil Aviation Organization), defines a communication protocol for secondary radars in its annex 10 (Aeronautical Telecommunications), Volume IV (Surveillance radar and anti-collision systems). The ICAO standard defines several modes of interrogation, such as modes A, C and S. Mode S is distinguished from modes A and C in that it allows selective interrogation of aircraft by employing an identification number specific to each aircraft. However, the mode S interrogations and responses are long as compared with the mode A or C interrogations and responses.

A mode S response is made up of a train of pulses comprising a preamble and a message. The preamble comprises four pulses of duration 0.5 μs each. The first two and the last two pulses are separated by 0.5 μs. The first and the third pulse are separated by 3.5 μs.

The responses to the selective interrogations (mode S) are of such a nature as to induce numerous false detections of secondary responses (mode A or C). The false detections are also called detections of ghost responses, that is to say of a signal having the form of a response, but not corresponding to any real response. Thus, the message of a mode S response can contain sequences of pulses having the form of a secondary response (mode A or C). Moreover, when the signals are deformed by multipaths, the mode S responses may induce numerous false detections of secondary responses. The false detections increase the processing load of the secondary radar. They may even create an overload leading to nondetection of correct responses.

Upon the appearance of the selective interrogations in the ICAO standard, the need to filter the mode S responses had made itself felt, to make it possible to detect the secondary responses with a minimum of false detections. Patent Application FR 2 692 995 filed on Jun. 30, 1992 describes a method of filtering mode S responses making it possible to preserve the secondary responses received during the time of the filtered mode S responses. This method is based on the selective elimination of the pulses belonging to a mode S response.

Be that as it may, this method, as well as the other methods of filtering mode S responses, carry out a prior detection of the mode S responses. The prior detection is performed in the presence of the four pulses of the preamble.

The filtering methods using the pulses of the preamble are no longer effective when pulses of the preamble are impaired or absent. Still, such a situation is common in the case of temporal overlap of responses at the receiver level, also known as garbling. Specifically, it may happen that the preamble of a mode S response is mixed with another secondary or mode S response, rendering this preamble unidentifiable.

SUMMARY OF THE INVENTION

The invention aims to solve these problems, and in particular to carry out a detection of mode S responses, this detection being effective even in the presence of garbling or multipaths. Accordingly, the invention has in particular as subject a method in which the signals received are processed before the responses are decoded or before searching for the presence of any pulses of the preamble.

Accordingly, a first stage of detection of the mode S responses is carried out, implementing the method according to the invention, in which the detection threshold is lowered with respect to the conventional detection techniques. This first stage of detection makes it possible to detect impaired responses, that is to say those that are not identifiable by their preamble pulses. Pre-detections of mode S responses are obtained on output from this first stage of detection. Within the framework of the present patent application, the expression "pre-detection of a response" is understood to mean the recognition of the presence of a response in a signal. A detection is distinguished from a pre-detection in that the position of the response is known precisely in a detection. Thus, a detection of a mode S response makes it possible to determine the position of an aircraft, while a simple pre-detection does not make this possible.

When seeking to process the mode S responses themselves, it is possible to use a second stage of detection, having the function of confirming certain pre-detections arising from the first stage of detection. Stated otherwise, the pre-detections are used to carry out detections. By using a second stage of detection, the detection threshold is raised, in such a way as to eliminate the responses whose messages are too impaired to be decoded.

By thus distinguishing two stages of detection, it is possible to use different detection criteria, one tailored to the filtering of the mode S responses for the processing of the secondary responses, the other tailored to the processing of the mode S responses themselves.

Thus, a subject of the invention is in particular a method for pre-detecting responses in a secondary radar, the responses to be pre-detected comprising a message coded by a modulated signal, characterized in that:

(i) the presence of a signal exhibiting modulation characteristics in accordance with those of a message of a response to be pre-detected is identified;

(ii) the duration of the signal identified is measured;

(iii) the duration of the signal identified is compared with a minimum duration, the minimum duration being determined on the basis of an expected duration of the messages of the responses to be pre-detected.

The responses whose duration is greater than the minimum duration thus form pre-detections according to the invention.

According to an advantageous embodiment, two channels are used, thereby affording a sharp gain in effectiveness. For example, it is possible to use the sum channel and the difference channel. The sum channel whose gain is substantially constant in the main lobe makes it possible to discriminate responses of different powers. The difference channel whose gain varies strongly with azimuth makes it possible to discriminate responses of similar powers (case of synchronous garbling or fruit) exhibiting an azimuthal deviation.

BRIEF DESCRIPTION OF THE DRAWINGS

Other characteristics and advantages of the invention will become apparent on reading the following detailed description presented by way of nonlimiting illustration and offered with reference to the appended figures, which represent.

DETAILED DESCRIPTION

Figure 1:
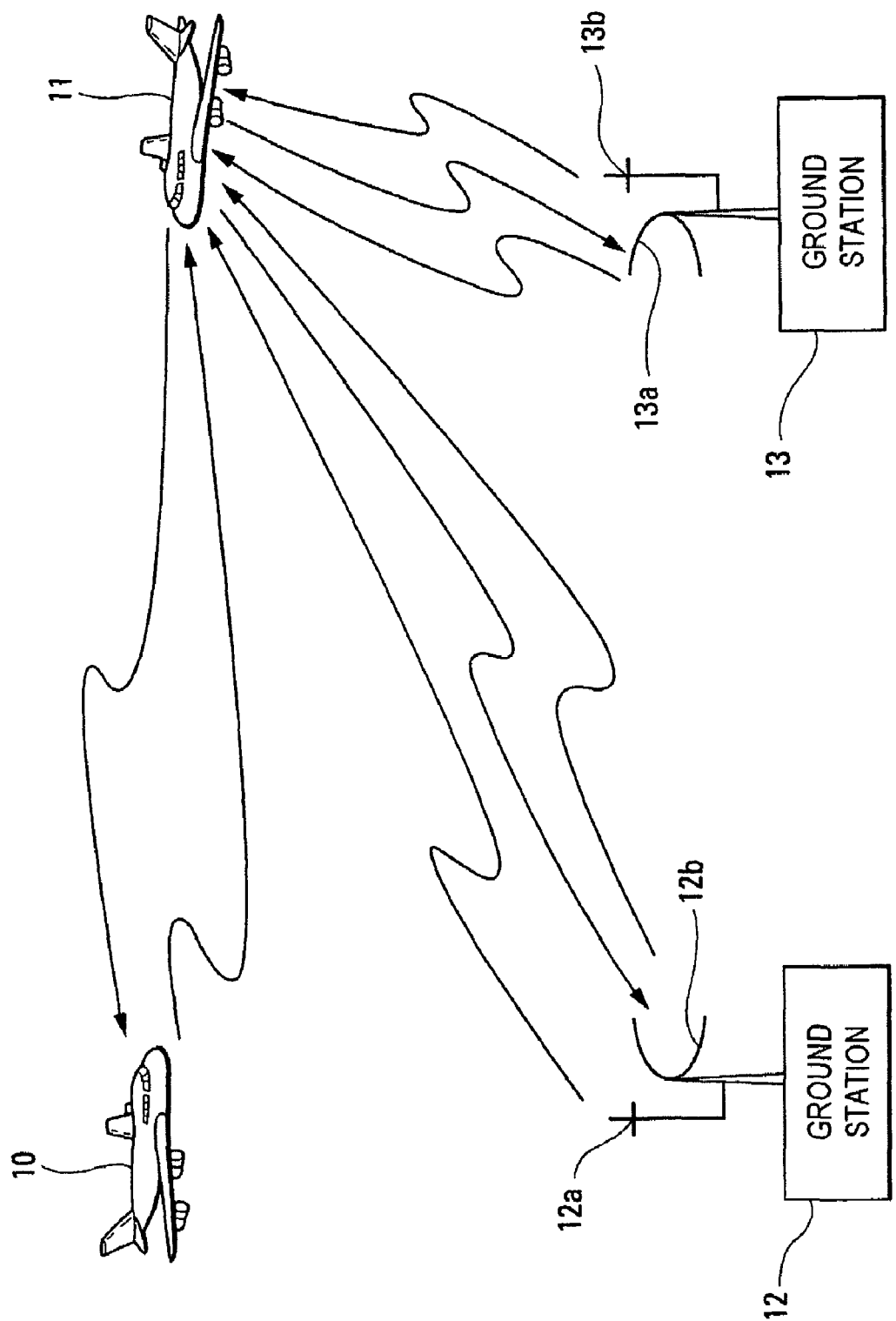
FIG. 1, an example of use of secondary radars.

We now refer to FIG. 1 in which is represented an exemplary use of secondary radars. The secondary radars may equip ground stations 12, 13. They generally comprise a directional antenna 12a, 13a. Each directional antenna 12a, 13a is used to emit an interrogation towards targets. The target 11, which receives an interrogation, responds according to a determined protocol by way of an onboard transponder (not represented). Each directional antenna 12a, 13a is generally associated with an omnidirectional antenna 12b, 13b. The omnidirectional antenna is used to emit pulses (one or two generally) making it possible to disable the responses of the transponders situated in emission sidelobes of the directional antenna 12a, 13a.

The targets 10, 11 may furthermore communicate with one another according to the same protocol. The targets then comprise not only a transponder, but also a secondary radar (interrogator).

Figure 2A:
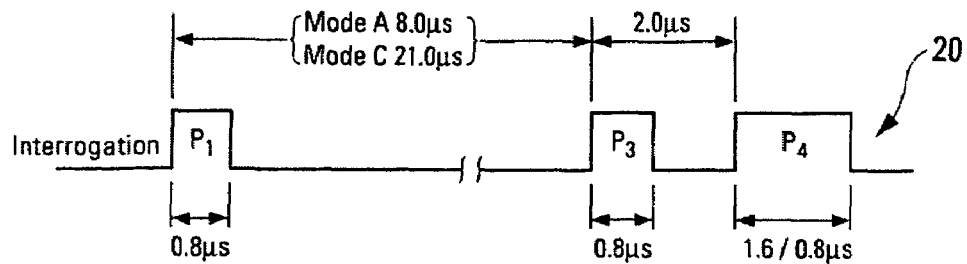
FIGS. 2a and 2b, examples of interrogations according to the ICAO standard.

We now refer to FIG. 2a in which is represented an exemplary interrogation 20 according to the ICAO standard. A person skilled in the art will find further particulars in the document relating to the standard itself.

The carrier frequency of an interrogation is 1030 MHz, plus or minus 0.2 MHz. An interrogation comprises two pulses designated $P_1$ and $P_3$. The interval between $P_1$ and $P_3$ determines the mode of interrogation. An interval of 8.0 µs (plus or minus 0.2 µs) corresponds to a so-called "mode A" interrogation. An interval of 21.0 µs (plus or minus 0.2 µs) corresponds to a so-called "mode C" interrogation. The duration of the pulses $P_1$, $P_3$ is 0.8 µs plus or minus 0.1 µs.

A multimode interrogation furthermore comprises a third pulse, $P_4$. The interval between the second pulse $P_3$ and the third pulse $P_4$ is 2.0 µs (plus or minus 0.05 µs). The duration of the third pulse determines the mode of interrogation. A short pulse (0.8 µs plus or minus 0.1 µs) corresponds to a so-called "mode A/C-only all-call" interrogation. A long pulse (1.6 µs plus or minus 0.1 µs) corresponds to a so-called "mode A/C/S all-call" pulse.

The person skilled in the art will find in the document relating to the ICAO standard the responses corresponding to these various interrogations.

Figure 2B:
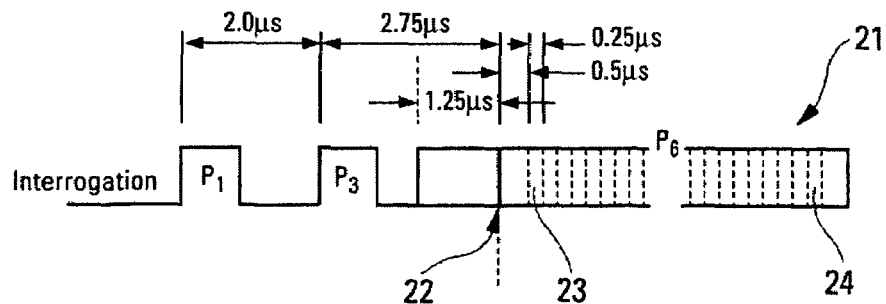

We now refer to FIG. 2b in which is represented another exemplary interrogation 21 according to the ICAO standard.

A so-called "mode S" interrogation comprises three pulses $P_1$, $P_2$, $P_6$. The duration of the pulses $P_1$ and $P_2$ is 0.8 µs plus or minus 0.1 µs. The duration of the pulse $P_6$ determines the mode of interrogation. A duration of 16.25 µs plus or minus 0.25 µs corresponds to a so-called "short mode S" (SMS) interrogation. A duration of 30.25 µs plus or minus 0.25 µs corresponds to a so-called "long mode S" (LMS) interrogation. The interval between $P_1$ and $P_2$ is 2.0 µs plus or minus 0.05 µs. The pulse $P_6$ comprises a first phase inversion 22. The interval between $P_2$ and the phase inversion 22 is 2.75 µs plus or minus 0.05 µs. The pulse $P_6$ starts 1.25 µs plus or minus 0.05 µs before the phase inversion 22. The pulse $P_6$ comprises phase inversions making it possible to code data bits 23 to 24. An SMS interrogation comprises 56 bits, a LMS interrogation comprises 112 bits. Additional information relating to this type of interrogation may be found in the ICAO standard.

Figure 3:
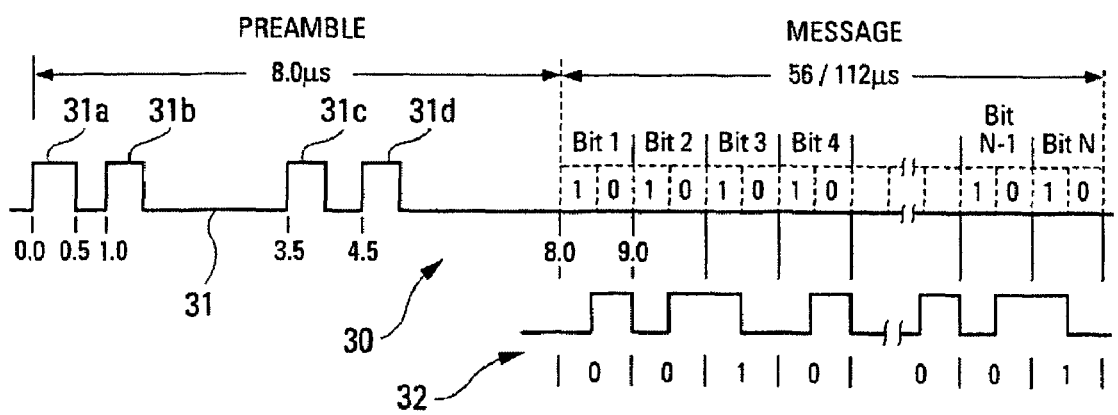
FIG. 3, an example of mode S response according to the ICAO standard.

We now refer to FIG. 3 in which is represented an exemplary mode S response according to the ICAO standard. The response 30 comprises a preamble 31 comprising four pulses 31a, 31b, 31c, 31d and a message 32. The message 32 comprises 56 or 112 bits (in response respectively to an SMS and LMS interrogation). The bits of the message are coded by a signal modulated in position. Each period of 1 µs corresponds to a message bit. Stated otherwise, the period of modulation of the signal is 1 MHz. The value of the bit is coded by the position of a pulse of 0.5 µs in the period of 1 µs. When the pulse is at the start of the duration (see for example bits no. 3, N in the figure), the bit equals 1. When the pulse is at the end of the duration (see for example bits no. 1, 2, 4, N−1 in the figure), the bit equals 0.

Figure 4:
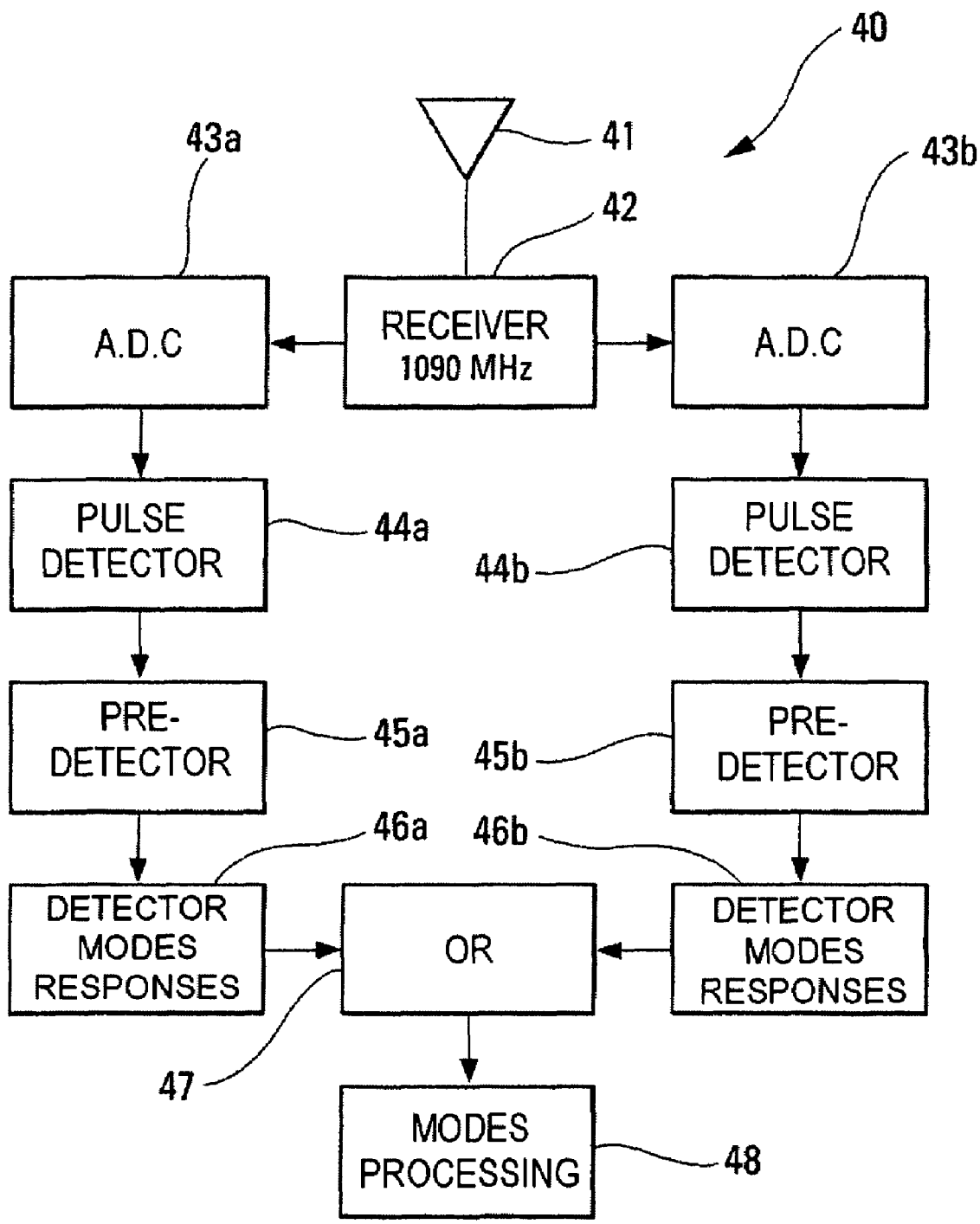
FIG. 4, a schematic of an example of a secondary radar implementing the method according to the invention.

We now refer to FIG. 4 in which is represented an exemplary secondary radar implementing the method according to the invention. The radar 40 comprises an antenna 41 able to receive an RF signal. This antenna 41 is linked to a receiver making it possible to transpose the RF signal into a video signal. The video signal is of the type of that represented in FIG. 3. However, this signal may be scrambled on reception.

The signal at the output of the receiver may be separated into two channels for example, a sum channel 43a, 44a, 45a, 46a and a difference channel 43b, 44b, 45b, 46b. These channels are obtained by effecting different combinations (in gain or in phase) of the signals arising from the radiating elements of the reception antenna 41 (array antenna). Each combination corresponds to a different antenna pattern. Of course, the number of channels may be equal to one or more than two. The processing operations on each channel are similar and are carried out in parallel.

Figure 5A:
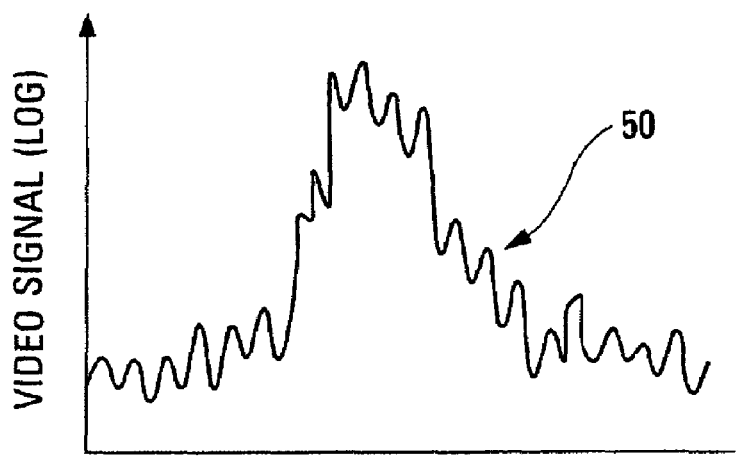
FIGS. 5a, 5b and 5c, respectively an example of analogue log video signal received in the presence of a pulse, this signal digitized, and the result of the detection of this pulse by thresholding.
Figure 5B:
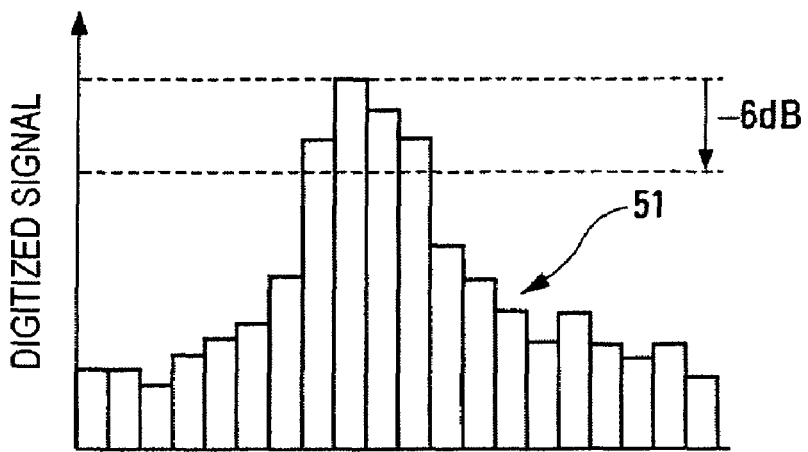

We now refer to FIGS. 5a and 5b, in which are represented respectively an exemplary analogue log video signal 50 received in the presence of a pulse, and digitized signal 51. The analogue log video signal 50 is the signal at the output of the receiver 42. It is digitized on each channel by an analogue/digital converter 43a, 43b (see FIG. 4) to give the digitized signal 51. Advantageously, a sampling frequency of the order of 20 MHz is chosen, thereby allowing precise analysis of the signal, while obtaining a good cost/effectiveness compromise.

Figure 5C:
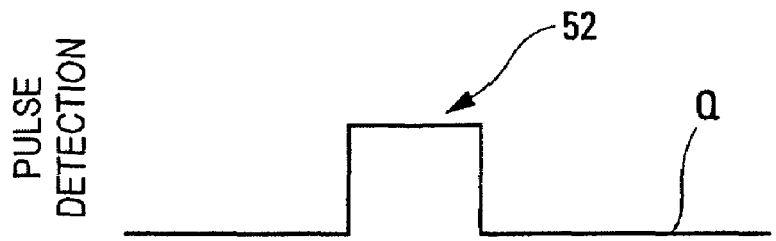

We now refer to FIG. 5c. In each channel, the digitized signal 51 is thereafter converted into a pulse detection signal, referenced Q. The signal Q is generated by a pulse detector 44a, 44b (see FIG. 4) performing adaptive thresholding, that is to say with respect to a level determined as a function of a peak level. This threshold may for example be a mid-height voltage threshold, that is to say −6 dB in log video. For the duration of a pulse, the pulse detector 44a, 44b generates a stable signal 52 at a predetermined level. Fluctuations in levels from one pulse to another are thus circumvented.

Figure 6:
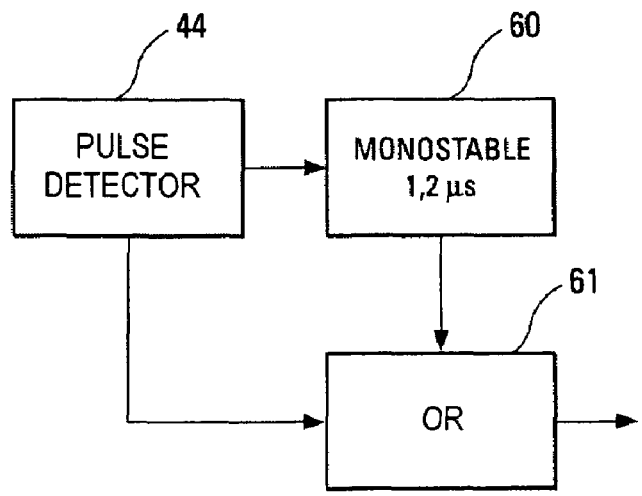
FIG. 6, an example of device for generating a slot.

We now refer to FIG. 6 in which is represented an exemplary device for generating a pre-detection slot. In each channel, the pulse detector 44 (that is to say 44a or 44b) is linked to a digital monostable 60. The monostable 60 may be triggered on the rising or falling edges. It makes it possible to generate a stable signal for a determined duration.

Advantageously, the monostable is triggered on the falling edges, and the duration is of the order of a modulation period, that is to say 1 µs for a mode S response according to the ICAO standard. The duration of the stable signal is advantageously greater than a modulation period, for example by 20%, so as to accept some degree of tolerance. Thus, in this example, the duration for which the stable signal is generated is substantially equal to 1.2 µs.

The output of the monostable 60 may be linked to the output of the pulse detector 44 by way of an OR gate 61. This makes it possible, when the monostable is triggered on the falling edges, to obtain the start of the pulse output by the slot generator.

Figure 7:
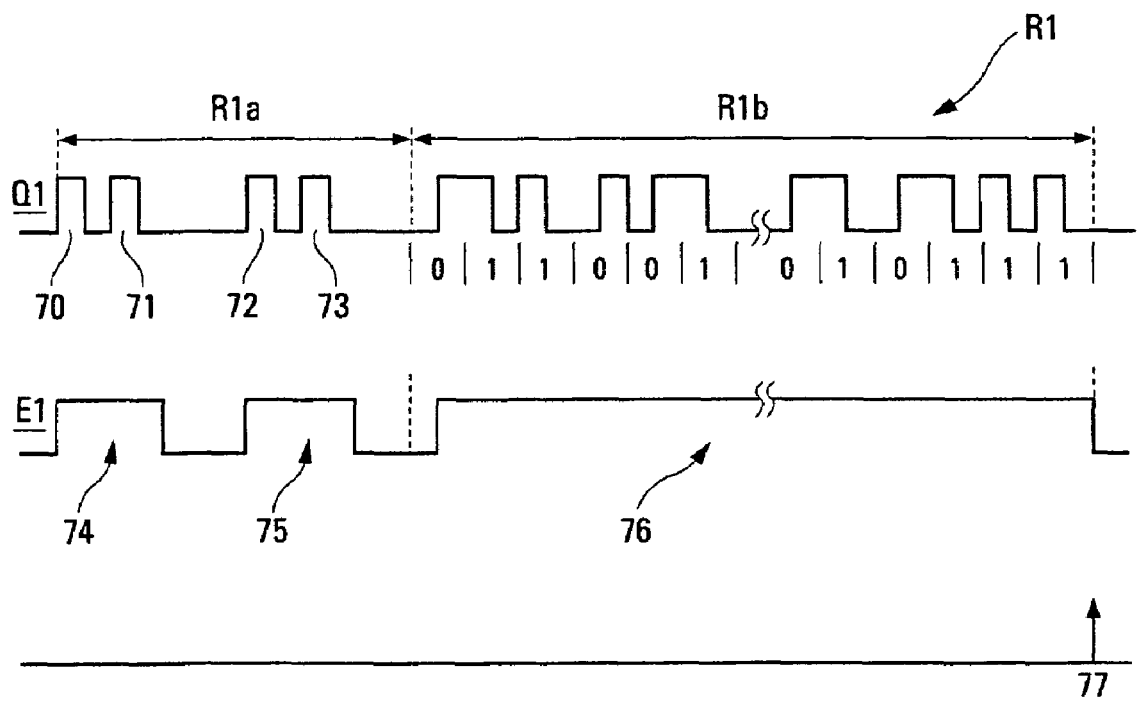
FIG. 7, an example of implementation of the invention for the pre-detection of a mode S response.

We now refer to FIG. 7 in which is represented an exemplary implementation of the invention for the pre-detection of a mode S response. The secondary radar receives a signal, referenced Q1 at the output of the pulse detector, corresponding to a mode S response. This response is referenced R1 before its transposition to RF. It is assumed in this example that the signal is not scrambled. The signal received Q1 is therefore similar to the response emitted R1.

The mode S response comprises a preamble R1a and a message R1b. The preamble R1a comprises four pulses 70, 71, 72, 73. The message R1b comprises 56 or 112 bits coded in position. In the response illustrated in FIG. 7, the first bits of the message are 0, 1, 1, 0, 0, 1 and the last bits are 0, 1, 0, 1, 1, 1.

In order to pre-detect a response, one seeks to detect the envelope of the signal. Stated otherwise, the presence of a signal exhibiting modulation characteristics in accordance with those of a message of a mode S response is identified. The messages of the mode S responses being coded by a position-modulated signal, the presence of a signal is identified when a sequence of pulses is present in which each pulse of the sequence is separated from that which precedes by at the most a duration of the order of a modulation period. The pre-detection slot is accordingly generated.

At the output of the device making it possible to generate the pre-detection slot, the signal referenced E1 is observed. The pulses of the preamble R1a give two slots 74, 75. The first slot 74 corresponds to the first two pulses 70, 71 of the preamble R1a. The second slot 75 corresponds to the next two pulses 72, 73 of the preamble R1a. The two slots 74 and 75 have a duration of the order of two modulation periods, that is to say 2 µs.

The message itself R1b gives a single slot 76 whose duration is substantially equal to that of the message. Specifically, the pulses of the message are separated by at most a modulation period (even during a succession of 1 then 0 bits). Consequently, the slot 76 has a duration of the order of 56 µs or of 112 µs according to whether the mode S response is an SMS or LMS response.

The duration of the signal identified, that is to say in this example of the slots generated, is measured. This measured duration is then compared with a determined minimum duration. This minimum duration is dependent on the expected duration of the messages of the responses to be pre-detected. The minimum duration is determined in such a way as to be less than or equal to the duration of the identified signal of any response to be pre-detected. If the duration of the identified signal is greater than the minimum duration, a response is pre-detected.

Thus, the duration of the slots 74 and 75 being rather smaller than the duration of a message, there is no pre-detection. On the other hand, the duration of the slot 76 being that of a response, a response 77 is pre-detected.

When one seeks to detect mode S responses, the duration of the response expected (56 µs or 112 µs) is known a priori. According to the invention, if the nature of the response (SMS or LMS) is known a priori, the minimum duration is determined on the basis of the duration of the message of the corresponding response (56 µs or 112 µs). If the nature of the response is not known a priori, the minimum duration is determined on the basis of the duration of the message of the shortest response (that is to say 56 µs for an SMS response).

The duration of the slot varies as a function of the value of the first and of the last bit of a message. If the first bit of a message is replaced with a 1 (instead of the 0 in the example illustrated), the slot 76 begins half a modulation period sooner, thus lengthening the slot 76 by as much. If the last bit of a message is replaced with a 0 (instead of the 1 in the example illustrated), the slot 76 terminates half a modulation period later, thus lengthening the slot 76 by as much. Consequently, the duration of the signal identified varies by a modulation period (1 µs) depending on the values at the start and end of a message.

According to the invention, to take account of this fluctuation, the minimum duration is determined on the basis of the duration of a slot generated on the basis of a mode S response message beginning with a 0 and terminating with a 1. The responses beginning with other values or terminating with other values will generate slots of greater duration.

Advantageously, this minimum duration may be proportional to the duration of a slot generated by a mode S response whose message begins with a 0 or terminates with a 1. The coefficient of proportionality making it possible to define the minimum duration on the basis of the duration of the slot is strictly less than 1 so as to accept some degree of tolerance, or equal to 1 otherwise.

For example when the slots are generated on the basis of the falling edge of the pulses, the minimum duration may be 54 µs (see the illustration in FIG. 7).

The invention thus makes it possible to pre-detect mode S responses without using the position of the pulses of the preamble. This makes it possible to pre-detect mode S responses having scrambled preambles.

According to an advantageous embodiment, when the length of the response is known, it is possible to deduce the position of the preamble either on the basis of the end of the message, or on the basis of the start of the message. This makes it possible to detect responses.

Figure 8:
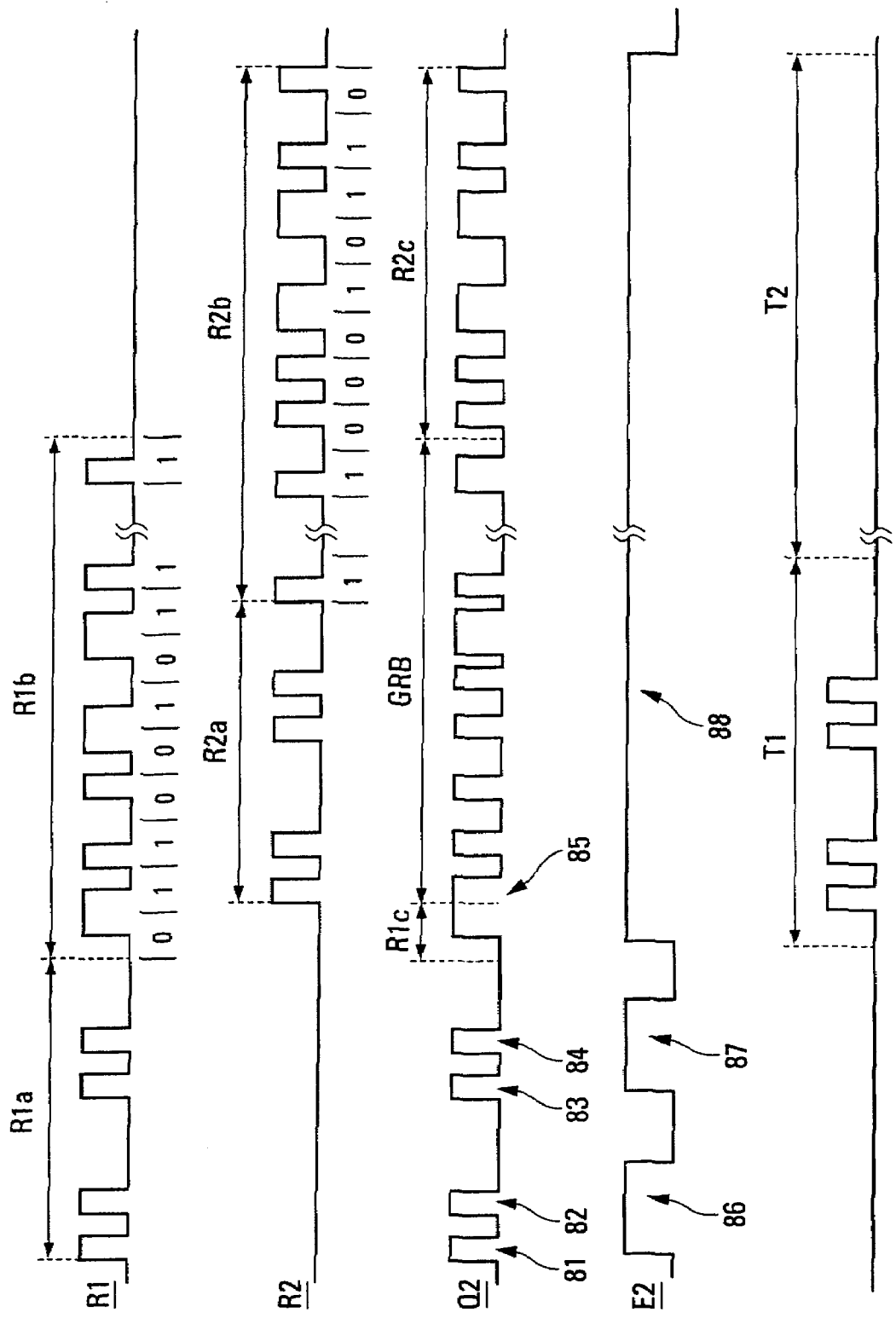
FIG. 8, an example of implementation of the invention applied to the detection of a mode S response whose preamble is scrambled.

We now refer to FIG. 8 in which is presented an exemplary implementation of the invention applied to the detection of a mode S response whose preamble is scrambled.

A first mode S response, referenced R1, is emitted by a first transponder. A second mode S response, referenced R2, is emitted by a second transponder. The respective distances of the transponders with respect to the secondary radar and the moments of emission of the two responses are such that the responses R1, R2 arrive mixed at the secondary radar level. More precisely, the preamble R2a of the second response is mixed with the message R1b of the first response. The signal received by the secondary radar output by the pulse detector is referenced Q2.

The signal Q2 comprises clear pulses 81, 82, 83, 84 which correspond to the preamble R1a of the first response R1. These four first pulses are followed by other pulses, some of which 85 are scrambled, which are distributed in three time periods R1c, GRB, R2c. The signal Q2 during the first period R1c corresponds to the start of the message R1b of the first response. The rest of the signal Q2, during the second period GRB, corresponds to the mixture of the rest of the message R1b of the first pulse with the preamble R2a and the start of the message R2b of the second pulse. The end of the signal Q2, during the third period R2c, corresponds to the end of the message R2b of the second response.

At the output of the device making it possible to generate the pre-detection slot, the signal referenced E2 is observed. The pulses of the preamble R1a give two slots 86, 87 of a duration of the order of two modulation periods (2 µs). The following pulses give a slot, which begins at the first pulse of the message R1b of the first response, and stops at the last pulse of the message R2b of the second response. The duration of the slot therefore makes it possible to pre-detect at least one response.

When the duration of the slot is greater than the determined minimum duration (pre-detection), the position of the end of the message of the last response is determined. This position corresponds to the end of the slot. From this, the position of the preamble of the last response can thus be deduced.

Likewise, the position of the start of the message of the first response is determined. This position corresponds to the start of the slot. From this, the position of the preamble of the first response can thus be deduced.

It is thus possible to determine the position of the preambles of two responses in the case of mixing of responses, these positions being determined without analyzing the supposedly preamble pulses.

When the position of the preamble is known, a detection can be performed on the basis of the preamble. For example, delay lines can be used to superimpose the four pulses of the preamble of the last (second) response. This preamble being scrambled, it is possible to search for the presence of 1, 2 or 3 pulses out of the four. Stated otherwise, a detection is generated when at least N pulses out of four are present at the forecast position T1 of the preamble, where N is a parameter whose value lies between 1 and 4, the limit value 1 being used to detect very scrambled responses, the limit value 4 being used to detect clear responses.

Advantageously, in the case of mixing of responses, one seeks to detect the preamble only of the first mode S response, that is to say the clear preamble. The last response can be detected by the end of the message and its message content as described in conjunction with FIG. 9.

The response R2 and the signal Q2 are represented therein. According to this advantageous variant, we analyze the pulses present in the zone where a response has been identified (R2a, GRB, R2c) on searching for a 0-1 or 1-0 transition, that is to say for a pulse of 1 µs or for a null of 1 µs.

Onwards of the first pulse or null, a clock signal CLK is generated 90 at a spacing of 1 µs. The clock is restarted 91, 92, 93, 94, at each pulse or null of 1 µs. This makes it possible to synchronize the clock with the end, presumed clear, of the last message. The uncertainty of 0.5 µs is thus lifted, since at each clock pulse we know that we are in the middle of the interval of 1 µs of a message bit. The clock signal 95 being situated just after the fallback of the pre-detection slot makes it possible to find the precise position of the end of the message of the last response. From this is thus deduced the precise position of the first pulse of the preamble of the last response.

By virtue of this technique, it is possible to perform detections, that is to say estimate the precise position of a response (the ambiguity of 0.5 µs is lifted).

Thus, the start (preamble) of the last mode S response is detected without decoding the message. It is possible to proceed in a similar manner so as to detect the start (preamble) of the first mode S response.

It is thus possible to carry out the detection 96, 97 of mode S responses without using the pulses of their preambles.

Figure 9:
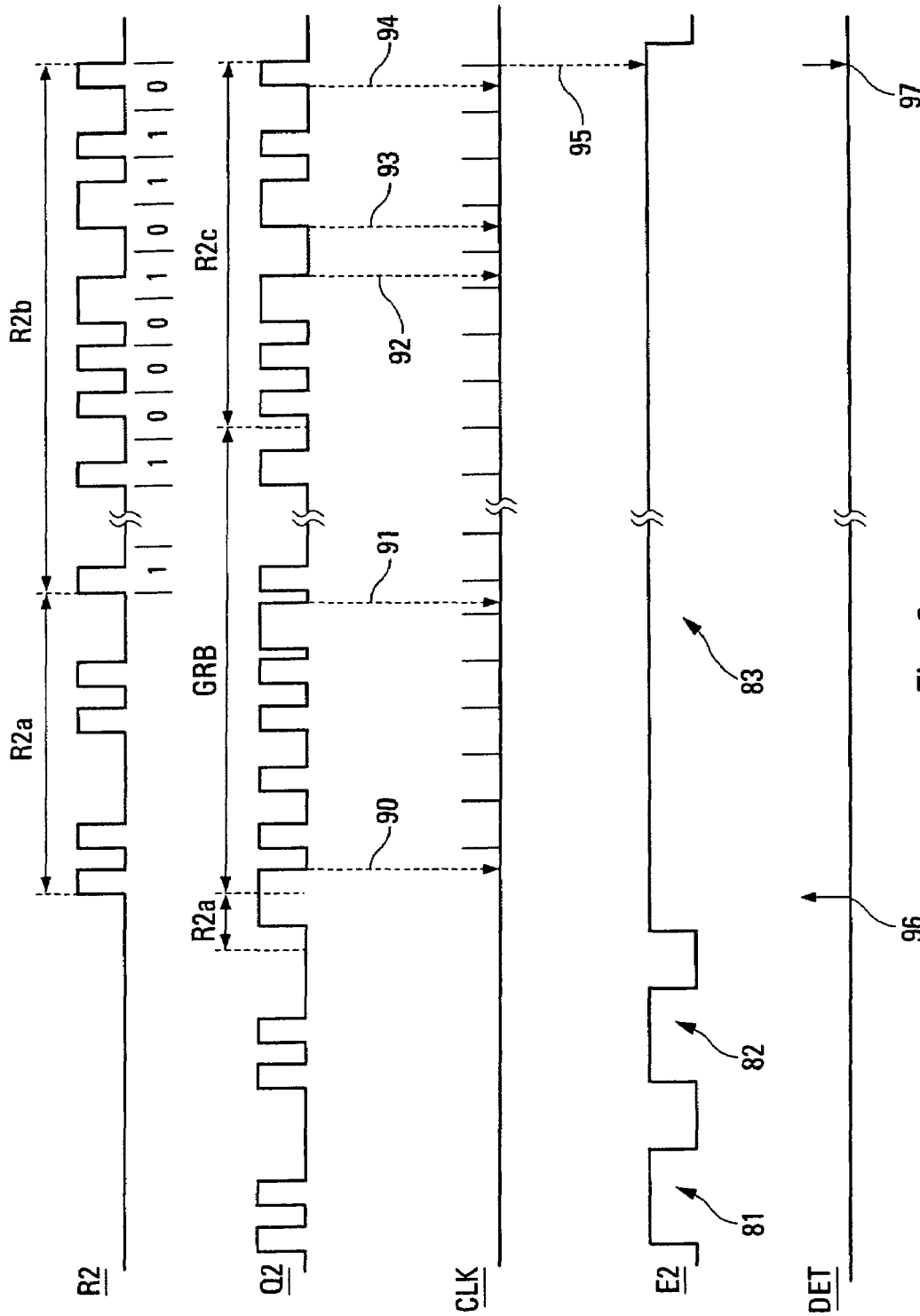
FIG. 9, an alternative implementation as compared with the example of FIG. 8.

Two possible modes of detection have thus been described:
 on the basis of the preamble, whose position is determined beforehand (FIG. 8) or,
 on the basis of the message itself, which is used to generate a clock signal with a binary tempo, to precisely determine the position of the start of the response on the basis of the start or of the end of the message (FIG. 9).

These two modes of detection may be implemented in parallel. If a response has been detected by these two modes (case of a clear response or one for which only a part of the message is scrambled for example), the mode of detection on the basis of the preamble is preferably used.

The invention claimed is:

1. A method for pre-detecting responses in a secondary radar, the responses to be pre-detected including a message coded by a modulated signal, the method comprising:
 a step (i) of identification, during which detection is made of the presence of a modulated signal with modulation characteristics corresponding to said modulation characteristics of a message included in a response to be pre-detected,
 a step (ii) of measurement during which the duration of the identified modulated signal is measured; and
 a step (iii) of comparison during which the said duration of the identified modulated signal is compared to a minimum duration, which is defined as being shorter than the duration of the message included in any of the responses to be pre-detected.

2. The method as claimed in claim 1, wherein, the signal coding the message being a position modulated signal in position, the presence of said modulated signal is identified by detecting a sequence of pulses, in which said each pulse is separated from the previous pulse by at most a duration of the order of a modulation period.

3. The method as claimed in claim 2, wherein, when said modulated signal corresponding to the message is identified, a slot is generated the duration of which is substantially equal to the duration between the first pulse and the last pulse of the sequence of pulses, to within about a modulation period.

4. The method as claimed in claim 3, wherein said slot is produced from the detected pulses by producing a stable signal beginning with the detection of the first pulse of the sequence and finishing with the detection of the last pulse.

5. The method as claimed in claim 4, wherein the said pulses are detected by comparing the modulated signal to a threshold determined as a function of a peak level of the modulated signal.

6. The method as claimed in claim 4, wherein said stable signal is generated beginning with a falling edge of the pulse and has duration substantially equal to the duration of a period of modulation raised by 20%.

7. The method as claimed in claim 6, wherein said pulses are detected by comparing the modulated signal to a threshold determined as a function of a peak level of the modulated signal.

8. The method as claimed in claim 3, wherein the duration of the identified modulated signal is determined by measuring the duration of the slot.

9. The method as claimed in claim 1, wherein the responses to be pre-detected being mode S responses, the minimum duration of the messages is of the order of 56 microseconds for short responses or of the order of 112 microseconds for long responses.

10. A method for detecting responses in a secondary radar, the responses to be detected including a preamble and a message, the preamble including protocol data, the message being coded by a modulated signal, the method comprising:
- a step of pre-detecting the responses to be detected, a response being pre-detected by identifying the message that it comprises;
- a step of determination during which forecast position of the preamble of each pre-detected response is determined; and
- a step of checking during which the presence of the determined protocol data at said forecast position of the preamble is checked;
- wherein the step of pre-detection implements a method further comprising:
  - a step (i) of identification, during which detection is made of the presence of a modulated signal with modulation characteristics corresponding to said modulation characteristics of a message included in a response to be pre-detected,
  - a step (ii) of measurement during which the duration of the identified modulated signal is measured; and
  - a step (iii) of comparison during which the said duration of the identified modulated signal is compared to a minimum duration, which is defined as being shorter than the duration of the message included in any of the responses to be pre-detected.

11. The method of detection as claimed in claim 10, wherein the forecast position of the preamble is determined on the basis of the beginning or of the end of the modulated signal identified in the pre-detection step.

12. The method as claimed in claim 10, wherein the responses to be detected being mode S responses, a detection is generated when at least N pulses out of four are detected at the forecast position of the preamble, where N is a parameter whose value lies between 1 and 4, the limit value 1 being used to detect very scrambled responses, the limit value 4 being used to detect clear responses.

13. A method for detecting responses in a secondary radar, the responses to be detected comprising a message coded by a modulated signal, said method comprising:
- a step of pre-detecting the responses to be detected, a response being pre-detected by identifying the message that it comprises;
- a step of generation during which a clock signal with a binary tempo is generated from the message included in the response;
- a step of precisely determining the position of the beginning of the response on the basis of the beginning or of the end of the message;
- wherein the step of pre-detection implements a method further comprising:
  - a step (i) of identification, during which detection is made of the presence of a modulated signal with modulation characteristics corresponding to said modulation characteristics of a message included in a response to be pre-detected,
  - a step (ii) of measurement during which the duration of the identified modulated signal is measured; and
  - a step (iii) of comparison during which the said duration of the identified modulated signal is compared to a minimum duration, which is defined as being shorter than the duration of the message included in any of the responses to be pre-detected.

* * * * *